United States Patent [19]

Trew

[11] Patent Number: 4,941,044
[45] Date of Patent: Jul. 10, 1990

[54] PROCESSING SUB-SAMPLED SIGNALS

[75] Inventor: Timothy I. P. Trew, Horley, England

[73] Assignee: U.S. Philips Corporation, New York, N.Y.

[21] Appl. No.: 353,360

[22] Filed: May 17, 1989

[30] Foreign Application Priority Data

Jun. 1, 1988 [GB] United Kingdom ................. 8812961

[51] Int. Cl.$^5$ .............................................. H04N 7/13
[52] U.S. Cl. ................................... 358/138; 358/133; 358/188
[58] Field of Search ................. 358/133, 138, 140, 188

[56] References Cited

U.S. PATENT DOCUMENTS

| 4,703,353 | 10/1987 | David .................................. 358/138 |
| 4,733,298 | 3/1988 | Koga .................................. 358/133 |
| 4,791,486 | 12/1988 | Spriggs .................................. 358/138 |
| 4,845,561 | 7/1989 | Doyle .................................. 358/138 |

Primary Examiner—Howard W. Britton
Attorney, Agent, or Firm—Edward W. Goodman

[57] ABSTRACT

A receiver for a high-definition television signal, in which the signal prior to transmission is sub-sampled on a segmented basis according to the degree of movement, has an input terminal (1) which receives the sub-sampled signal which is applied to an inverse shuffler (2) which shuffles the pixels of each block in a manner which is the inverse to that performed prior to transmission. The output of shuffler (2) is applied to a first delay arrangement (4) which provides one or more delays of an integral number of fields periods and whose delayed and undelayed outputs are applied to an input field selector (6) to produce a changed sequence of fields to that received. The selector output is applied to a processing arrangement (8) in which the signal of changed field sequence is subjected to spatial interpolation and/or temporal interpolation and the resulting interpolated signal applied to a second delay arrangement (10) providing one or more delays of an integral number of fields periods. The delayed and undelayed outputs of delay arrangement (10) are applied to an output field selector (12) to produce an output in which the original field sequence is restored.

30 Claims, 3 Drawing Sheets

PROCESSING SUB-SAMPLED SIGNALS

BACKGROUND OF THE INVENTION

1. Field of the Invention

The invention relates to a method of processing a signal representing a sequence of two-dimensional images conveyed in sub-sampled form by way of a transmission channel or record carrier and subjected, prior to said conveyance, to different sampling structures on a segmented basis depending on the degree of movement and/or the character of spatial information, said method including the step of receiving the sub-sampled signal from said transmission channel or record carrier sequentially on a field by field basis. The invention also relates to receiving apparatus for use with the above method.

2. Description of Related Art

Such a method of processing and apparatus are disclosed in the papers "Adaptive spatial sub-sampling for HD-MAC" by O.J. Morris and T.I.P. Trew and "Motion compensated interpolation applied to HD-MAC pictures encoding and decoding" by F. Fonsalas, M. Haghiri and P. Hayet which were presented at the 2nd International Workshop on Signal Processing of HDTV held at L'Aquila, Italy between Feb. 29, and Mar. 2, 1988. The method and apparatus described in these papers are for use with a coding system as described in a further paper presented at the same workshop "An HD-MAC coding system" by F.W.P. Vreeswijk, W. Jonker, J.R.G.M. Leenen and J. van der Meer which achieves a bandwidth compression factor of four with little loss in resolution by adapting to the motion in the picture being transmitted. The coding system transmits information taken from one instant in time over four field periods in stationary areas of picture, over two field periods in areas of slow motion, and over one field period where the motion is rapid. These three modes of operation are known as the 80 ms, 40 ms and 20 ms branches for a 50 Hz field frequency, 2:1 interlaced system. An overall compression of 4:1 is required between the 25 MHz luminance bandwidth of the 1250-line high definition camera and the 625-line 6 MHz transmission channel. The system therefore makes a compromise between discarding temporal and spatial resolution as shown in the following example:

| System Period | Temporal Compression | Spatial Compression |
|---|---|---|
| 80 msec | 2:1 | 2:1 |
| 40 msec | 2:1 | 2:1 |
| 20 msec | 1:1 | 4:1 |

Thus several different field rates are used for different velocity ranges as follows:
  i. In a stationary mode (velocity range: 0–0.5 pixels/40 msec) the field rate is 12.5 Hz and the basic interval is 80 msec.
  ii. In a slowly moving mode (velocity range: 0.5–1.5 pixels/40 msec) the field rate is 25 Hz and the basic interval is 40 msec.
  iii. In a moving mode (velocity range: above 1.5 pixels/40 msec) the field rate is 50Hz and the basic interval is 20 msec.

One possibility is for these temporal branches to use fixed spatial quincunx sub-sampling patterns with filtering optimized for high horizontal and vertical resolution at the expense of diagonal resolution. There will be some spatial structure within pictures for which this is not the most appropriate form of filtering and, therefore, adapting the spatial processing according to the picture content by introducing sub-branches within each branch may give a substantial improvement in quality. Each sub-branch can support different spatial frequencies; the transmitter selects the sub-branch that best represents the frequencies in an area of the picture and signals this to the receiver through the digital assistance (DATV) channel. For this reason the paper by Morris et al proposes that each branch can comprise a number of sub-branches having different sub-sampling patterns. The coding systems described in the papers of Vreeswijk et al and Morris et al and the processing method and apparatus of the latter paper are also contained in our co-pending European patent application No. 88202912.7. This application and the above mentioned papers are incorporated herein by way of reference.

The paper by Morris et al proposes the use of adaptive spatial interpolation to improve the performance of bandwidth reduced systems at the receiver, while the paper by Fonsalas et al purposes the use of motion compensated spatial interpolation for the same purpose. This allows the 40 ms branch to be used in areas having a velocity range above 1.5 pixels per 40 msec. The latter technique provides a problem when interpolating across the boundaries between areas processed prior to transmission through different branches having, respectivey, a low frame rate and a high frame rate which can result in holes being left in the intermediate fields where information is transmitted in only half the fields as is the case in the 40 ms branch. Some estimate is required for this area in order to 'run-in' the filters interpolating pixels in the surrounding non-motion-compensated areas. It is not possible to simply insert the information from the previous field, which is the procedure used in non-motion-compensated multi-branch systems, since dislocations might occur in features crossing the area or block boundary. Indeed, the motion thresholds for each branch in non-motion-compensated systems are set so that this dislocation will be imperceptible. It is not advisable to project the missing block back into the previous frame along the motion vector, inserting the sub-sampled pixels within the image into the vacant area in the current field, since the block image might not have pixels in the correct phase with the expected sub-sampling structure or might even include areas transmitted through other branches. One possible solution is to fully interpolate the previous frame and to project the missing block in the current frame back onto this. The resulting image would then be moved into the position of the missing block and sub-sampled with the correct structure. This does not give perfect results since the motion vectors are selected so as to provide a reasonable interpolation when projected to both the preceding and following frames, and the displaced images averaged. If only one image is used then dislocations are introduced due to errors in the motion vectors, introducing spurious structure along the block boundaries. Such a solution is considered to be unacceptable.

SUMMARY OF THE INVENTION

It is an object of the invention to provide a method and apparatus which overcomes the above objection and which can be used with spatial interpolation as well as motion compensated interpolation.

The invention provides a method of processing a signal representing a sequence of two-dimensional images conveyed in sub-sampled form by way of a transmission channel or record carrier and subjected, prior to said conveyance, to different sampling structures on a segmented basis depending on the degree of movement and/or the character of spatial information, said method including the step of receiving the sub-sampled signal from said transmission channel or record carrier sequentially on a field by field basis, said method being characterized by the further steps of:

i. forming from said received sub-sampled signal a further sub-sampled signal containing the same information but in which the order of the fields is changed compared with that in said received signal,
  ii. subjecting said further sub-sampled signal to inter-field and/or intra-field processing, and
  iii. forming from the resulting processed signal an output signal in which the order of the fields is restored to the sequence present n said recieved signal.

The invention has the advantage that it is possible to fully interpolate both the previous and following fields from which information for such interpolation originate before inserting an estimate for the intermediate field.

The order of the fields in the further sub-sampled signal may be dependent upon the segmented sampling structures of the received sub-sampled signal while the nature of the inter-field or intra-field processing to which the further sub-sampled signal in subjected may be dependent upon the segmented sampling structure of the received sub-sampled signal.

In forming the received sub-sampled signal into the further sub-sampled signal, the received sub-sampled signal may have its field subjected to zero or an integral number of field periods delay in a given sequence over a given number of field periods, while in forming the processed signal into said output signal, the processed signal may have its fields subjected to zero or an integral number of field periods delay in a further given sequence over said given number of field periods, the overall delay period to which each field is subjected between receiving the sub-sampled signal and the output signal being the same.

The further sub-sampled signal may be subjected to spatial interpolation under the control of a control signal received with the received sub-sampled signal which control signal relates to the character of the spatial information and/or the motion of the received sub-sampled signal. This control signal may form part of a digitally assisted television signal (DATV).

The further sub-sampled signal may be subjected to motion compensated temporal interpolation under the control of an additional signal received with the received sub-sampled signal which additional signal relates to the degree of movement of the received sub-sampled signal. This additional signal may also form part of the DATV signal.

Where the sub-sampled signal, as received, is a television signal in which the lines are interlaced over a number of field periods, the received sub-sampled signal may be converted to a non-interlaced signal having the same field period as the received signal prior to forming the further sub-sampled signal which on processing is re-converted to a form an interlaced signal.

The invention further provides receiving apparatus for use with a system in which a signal representing a sequence of two-dimensional images is conveyed in sub-sampled form by way of a transmission channel or record carrier and subjected, prior to transmission, to different sampling structures on a segmented basis depending on the degree of movement and/or the character of spatial information, said receiveing apparatus comprising means for receiving the sub-sampled signal from said transmission channel or record carrier sequentially on a field-by-field basis, characterized in that said apparatus further comprises means for forming from said received sub-sampled signal a further sub-sampled signal containing the same information but in which the order of the fields is changed compared with that in said received signal, means for subjecting said further sub-sampled signal to inter-field and/or intra-field processing, and means for forming from the resulting processed signal an output signal in which the order of the fields is restored to the sequence present in said received signal.

The means for forming the further sub-sampled signal may comprise means for arranging the fields of the further sub-sampled signal in an order which depends on the segmented structures of the received sub-sampled signal.

The nature of the operation of the processing means may be dependent upon the segmented sampling structure of the received sub-sampled signal.

The means for forming said further sub-sampled signal may comprise a first delay arrangement for subjecting the received fields to zero or an integral number of field periods delay in a given sequence over a given number of field periods, while the means for forming said output signal may comprise a second delay arrangement for subjecting the fields of the processed signal to zero or an integral number of fields periods delay in a further given sequence over said given number of fields periods, the overall delay period to which each field is subjected between the received sub-sampled signal and the output signal being the same.

The apparatus may further comprise means for receiving, with the received sub-sampled signal, a control signal relating to the character of the spatial information and/or the motion of the received signal, the processing means subjecting the further sub-sampled signal to spatial interpolation under the control of the control signal.

The apparatus may additionally comprise means for receiving, with the received sub-sampled signal, an additional signal relating to the degree of movement of the received signal, the processing means subjecting the further sub-sampled signal to motion compensated temporal interpolation under the control of this additional signal.

Where the received sub-sampled signal is a television signal in which the line are interlaced over a number of field periods, the apparatus may further comprise means for converting the received sub-sampled signal into a non-interlaced signal of the same field period, while the processing means may comprise means for converting the processed signal into an interlaced signal.

BRIEF DESCRIPTION OF THE DRAWINGS

The above and other features of the invention will be described by way of example with reference to the accompanying drawings, in which.

DESCRIPTION OF THE PREFERRED EMBODIMENT

Figure 1:
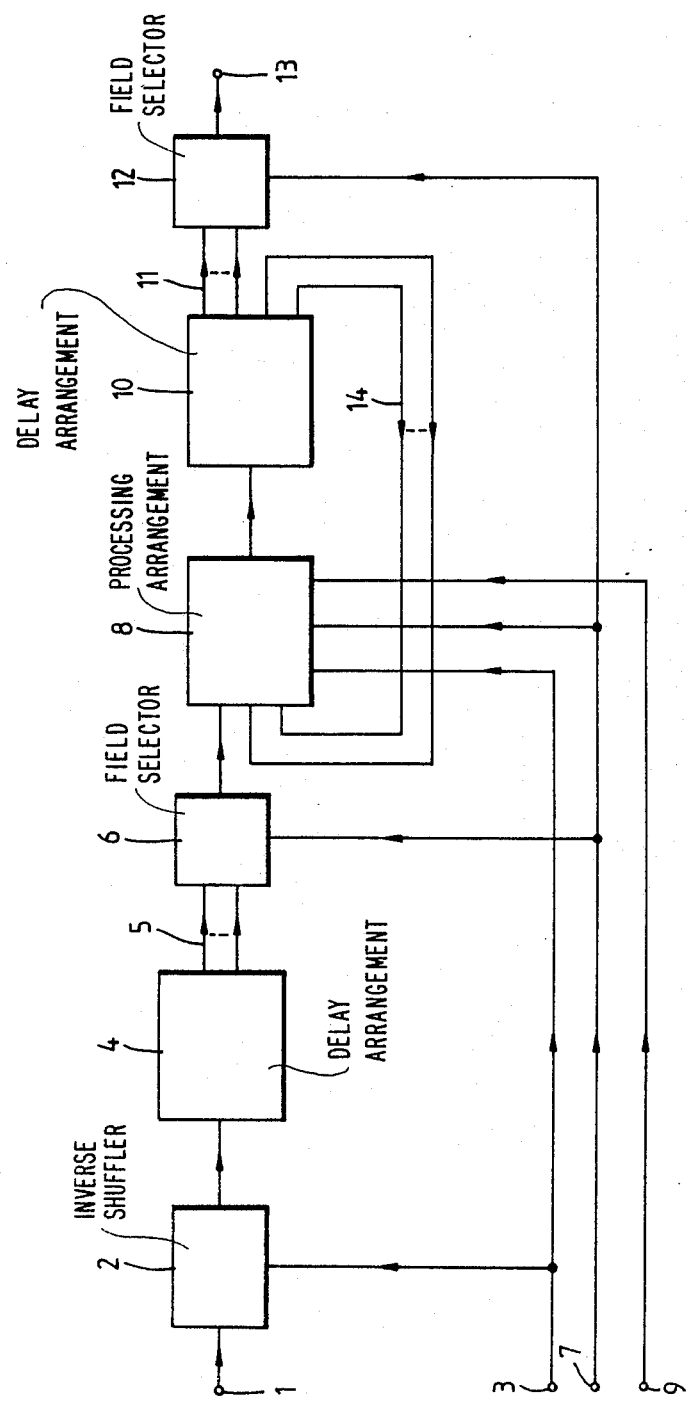
FIG. 1 is a block diagram of receiving apparatus according to the invention.

FIG. 1 is a block diagram of part of a receiving arrangement for receiving a sampled high definition television signal which may be 625 lines, 50 fields per second, 2:1 interlaced which is derived, prior to transmission, from a 1250 lines, 50 fields per second, 2:1 interlaced source. This and other figures do not include the facilities for "front end" processing of the received signal, namely frequency selection, frequency changing and subsequent amplification, and demodulation, as these processes are well known in themselves and are not essential for an understanding of the present invention. In addition the separation of the various components of the received television signal, which may well be of the MAC packet type, are also not shown as this is also not essential for the present understanding.

The resulting vision e.g. luminance component is applied via an input terminal 1 to an inverse shuffler 2, if the samples are shuffled prior to transmission, in which the samples are restored to their correct positions which they occupied prior to shuffling on a block-by-block basis. The nature of the inverse shuffling, when required, is controlled by a branch selection component present at an input 3 which component forms part of a digitally assisted signal (DATV) which is transmitted as a part of the television signal, the various components of the DATV signal being separated in an earlier part of the receiver. The inverse shuffler 2, or other up-converter when present, produces a 1250 line, 50 fields per second, either non-interlaced or 2:1 interlaced, depending on the nature of the interpolation or other processing that the signal is to be subjected to, of coarse structure. Although in the non-interlaced case the single field forms the frame, the term field will be used either to indicate such a single field or one of the fields of a frame of an interlaced signal. The resulting signal is applied to a first delay arrangement 4 which can provide a delay or delays of one or more field periods and will have at its outputs 5 signals both undelayed and delayed by given numbers of field periods again depending on the nature of the interpolation or other processing to which the field is to be subjected. These outputs 5 are applied to an input field selector 6 which, under the control of a further input, selects the undelayed and delayed signals in a predetermined order, the control input being connected to an input 7, at field rate which can indicate the number of the fields in a sequence. The sequence of selected fields is applied to a processing arrangement 8 providing inter-field and/or intra-field processing of the applied signals and which may include spatial interpolation and/or motion compensated temporal interpolation and/or any other appropriate form of signal processing. To enable the processing to be carried out, the arrangement 8 receives the branch component information from input 3, the field number information from input 7 and motion vectors which also form part of the DATV signal from a further input 9. The resulting processed signal of fine structure is applied to a second delay arrangement 10 which can provide a delay or delays of one or more field periods and will have at its outputs 11 signals both undelayed and delayed by given numbers of field periods, though not necessarily the same for the first delay arrangement 4, but dependent upon the nature of the processing to which the signal has been subjected. These outputs 11 are applied to an output field selector 12 which, under the control of the field number at input 7, selects the appropriately undelayed and delayed signals in a sequence such that at an output terminal 13 and HDTV signal is provided in interlaced form the fields of which are in the sequence which corresponds to that of the fields at the input terminal 1. If the processing arrangement provides temporal interpolation then certain delayed fields will be applied from the second delay arrangement 10 by way of outputs 14 to the processing arrangement 8. It should be noted that the delay arrangements 4 and 10 and the selectors 6 and 12 need to be such that each field is subjected on total to the same delay between the input terminal 1 and the output terminal 13 so that the changed field sequence present at the output of input field selector 6 is restored to its original sequence at the output of the output field selector 12.

Figure 2:
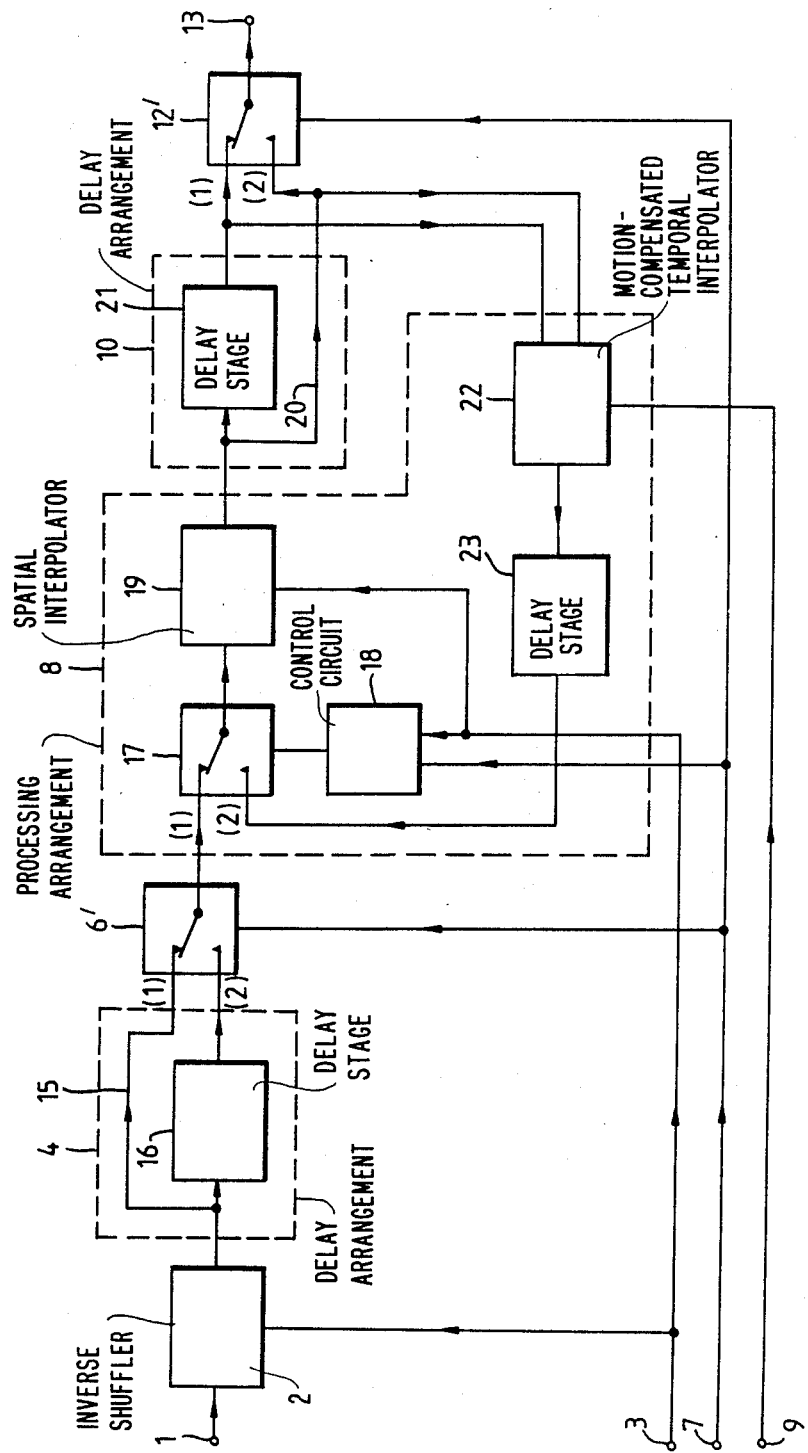
FIGS. 2 and 3 are more detailed diagrams of such apparatus.

FIG. 2 is a block diagram of one detailed form of the arrangement of FIG. 1 for processing a received 625 line, 50 fields per second, 2:1 interlaced signal which has been processed on the transmission side in the manner described in the introduction. In FIG. 1 and 2 like reference symbols indicate like components. In the described manner each television picture is divided into a plurality of adjacent blocks and the degree of movement determined for each block. Each block is then subjected to two dimensional spatial filtering the characteristics of which are determined by the degree of movement and each filtered block is then subjected to spatial and temporal sub-sampling again depending on the degree of movement and on the character of the spatial information. The temporal sub-sampling may be sparser than would otherwise be required for adequate motion portrayal as motion vectors are transmitted to aid temporal interpolation in the receiver. In this case the motion vectors are associated with the 40 ms branch of the described three branch system. This provides a sub-sampled television signal for transmission over air or by way of a record carrier. The received signal is applied via the input terminal 1 to the inverse shuffler 2 to produce a 1250 line, 50 fields per second, non-interlaced signal. In FIG. 2 the first delay arrangement 4 comprises an undelayed path 15 and a delay stage 16 providing a delay of 40 ms (2 field periods), the undelayed and delayed outputs of delay stage 4 being applied to respective first (1) and second (2) inputs of the input field selector here indicated by the reference 6' and which is in the form of a two position switch. The field frequency signal at input 7 identifies odd and even numbered fields in the received vision signal at input terminal 1 and controls the state of selector 6' from field such that during odd numbered input fields, the selector output is derived from first input (1) while during even numbered input fields, the selector output is derived from the second input (2).

The processing arrangement 8 comprises in FIG. 2 a block selector 17 having a first input (1) connected to the output of input field selector 6' and a second input (2) the connection for which will be described below. Block selector 17 is in the form of a two position switch whose output is controlled from a control circuit 18 which itself receives inputs from the branch selection component 3 and the field frequency input 7. When the branch selection component indicates that the vision input has been processed at the transmitter through a particular branch, in this case a 40 ms branch, the control circuit 18 arranges for the block selector 17 to be controlled at field frequency such that during odd numbered input fields, it derives its output from its first input (1), while during even numbered input fields, it derives its output from its second input (2). At times when the branch selection component indicates that the input vision signal has been processed at the transmitter through a 20 ms or 80 ms branch then the output of block selector 17 remains connected to its first input (1). The output of block selector 17 is applied to a spatial interpolator 19 which can operate on non-uniform sub-sampling structures under the control of the branch selection component at input 3, a suitable interpolator being described in our above-mentioned co-pending patent application. The output of spatial interpolator 19 forms the output of the processing arrangement 8 which is applied to the second delay arrangement 10 which, as with the first delay arrangement 4, comprises an undelayed path 20 and a delay stage 21 providing a delay of 40 ms (2 field periods). The delayed and undelayed outputs of delay arrangement 10 are respectively applied to first (1) and second (2) inputs of the output field selector indicated in FIG. 2 by the reference 12' and which as with selector 6' is in the form of a two position switch. During odd numbered input fields, the selector 12' output is derived from its first input (1) while during even numbered input fields, this output is derived from its second input (2) under the control of the field frequency input 7.

The outputs of the delay arrangement 10 are connected to respective inputs of a motion-compensated temporal interpolator 22 (MCTI) providing the required interpolation algorithm in response to motion vectors received at input 9. The motion-compensated temporal interpolator 22 may operate in the manner described in the Fonsalas et al paper mentioned in the introduction. The output of interpolator 22 is applied through a further delay stage 23 providing a delay of 20 ms (one field period) to the second input (2) of selector switch 17.

The operation of FIG. 2 is as follows. The vision signal at input terminal 1 after inverse shuffling in the shuffler 2 as previously described produces the 1250 lines, 50 fields per second, non-interlaced signal. Due to the combined operation of the first delay arrangement 4 and the input field selector 6', the odd numbered fields appear undelayed at the output of selector 6', while the even numbered fields appear delayed by two field periods at the output of selector 6'. It is initially assumed that the vision signal originates from a 20 ms or 80 ms branch in which the received vision information is valid for every field period in which case block selector 17 will be set to convey the output of input selector 6' to the input of spatial interpolator 19 during successive field periods although out of sequence. Due to the combined operation of the second delay arrangement 10 and the output field selector 12', the odd numbered fields appear delayed by two field periods by the second delay arrangement 10 at the output of field selector 12' while the even numbered fields appear without further delay by the second delay arrangement 10 at the output of selector 12', so that the resulting interpolated vision signal has both odd and even fields delayed by two field periods so that the original field sequence is restored. This is best illustrated by the following Table 1 in which in this and other tables OP indicates an output and the reference numerals indicate the relevant units at which the output signals are present:

TABLE 1

| | | FIELD NUMBER | | | | | | | | | | | | | | | |
|---|---|---|---|---|---|---|---|---|---|---|---|---|---|---|---|---|---|
| 2 | OP | 1 | 2 | 3 | 4 | 5 | 6 | 7 | 8 | 9 | 10 | 11 | 12 | 13 | 14 | 15 | 16 |
| 17 | OP | 1 | | 3 | 2 | 5 | 4 | 7 | 6 | 9 | 8 | 11 | 10 | 13 | 12 | 15 | 14 |
| 12' | OP | | | 1 | 2 | 3 | 4 | 5 | 6 | 7 | 8 | 9 | 10 | 11 | 12 | 13 | 14 |

If however the vision signal originates from a 40 ms branch in which the even numbered fields contain the same information as the preceding odd numbered field which is used by the inverse shuffler 2 to produce information only during the odd numbered field periods then the block selector switch 17 is set to operate at field rate such that only these odd numbered fields are applied directly to the spatial interpolator 19, while each even numbered field is interpolated from its adjacent odd numbered fields. For this purpose these adjacent fields are applied to respective inputs of the motion-compensated temporal interpolator 22 to produce interpolated even numbered fields which are delayed by one field period in delay stage 23 before being applied to the second input (2) of selector switch 17. This processing and the resultant outputs are best illustrated by the following Table 2 in which the underlined even field numbers indicate the fields which are interpolated from the odd numbered fields on either side:

TABLE 2

| | | FIELD NUMBER | | | | | | | | | | | | | | | |
|---|---|---|---|---|---|---|---|---|---|---|---|---|---|---|---|---|---|
| 2 | OP | 1 | 2 | 3 | 4 | 5 | 6 | 7 | 8 | 9 | 10 | 11 | 12 | 13 | 14 | 15 | 16 |
| 17 | OP | 1 | | 3 | 2 | 5 | 4 | 7 | 6 | 9 | 8 | 11 | 10 | 13 | 12 | 15 | 14 |
| 21 | OP | | | 1 | | 3 | 2 | 5 | 4 | 7 | 6 | 9 | 8 | 11 | 10 | 13 | 12 |
| 22 | OP | | | | 2 | 1 | 4 | 3 | 6 | 5 | 8 | 7 | 10 | 9 | 12 | 11 | 14 | 13 |
| 23 | OP | | | | | 2 | 1 | 4 | 3 | 6 | 5 | 8 | 7 | 10 | 9 | 12 | 11 | 14 |
| 12' | OP | | | 1 | 2 | 3 | 4 | 5 | 6 | 7 | 8 | 9 | 10 | 11 | 12 | 13 | 14 |

A major benefit of the above arrangement is where there is a change in the branch type between adjacent blocks with a change from a 40 ms branch to a 20 ms or 80 ms branch or vice versa. From a comparison of the output of selector 17 in Tables 1 and 2 it will be appreciated that information from areas produced by 20 ms or 80 ms branches is readily merged with information produced by the 40 ms branch for spatial interpolation.

Figure 3:
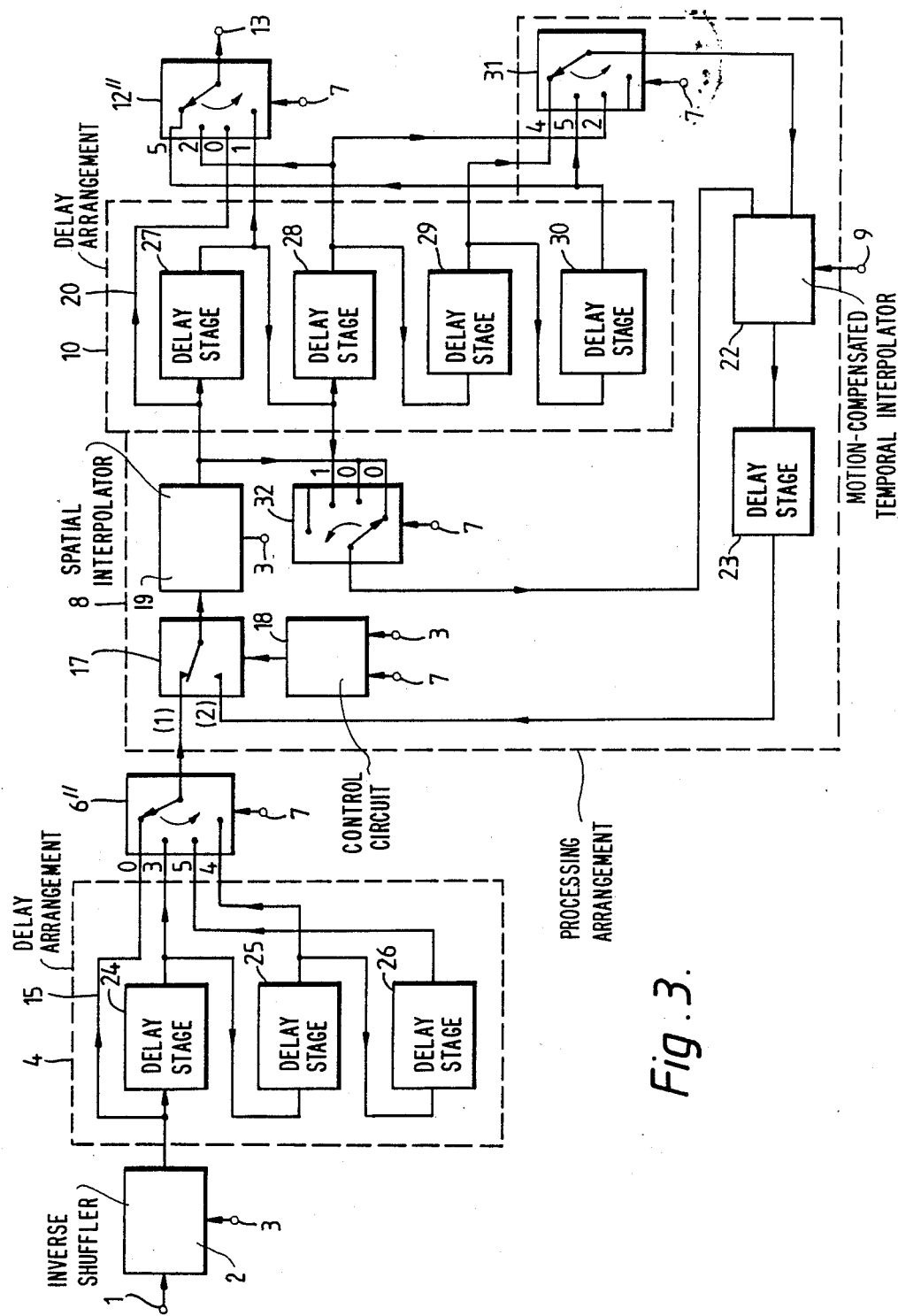

FIG. 3 is a block diagram of a second detailed form of FIG. 1 capable of additionally processing information obtained from an 80 ms branch and may be seen as a modification of the block diagram of FIG. 2. Corresponding components present in the figures are given like reference symbols. As in FIG. 2 the information at input terminal 1 is shuffled in inverse shuffler 2 under the control of the branch selection component at input 3. The first delay arrangement 4 comprises the undelayed path 15 and three serially connected delay stages 24, 25 and 26 respectively providing individual delay periods of 60 ms, 20 ms and 20 ms (three, one and one field periods). The undelayed path 15 and the output of the delay stages 24, 25 and 26 are connected to respective inputs of the input field selector here indicated by reference 6" and against each input is noted the number of field period delays the information has been subjected to with respect to that at the output of the inverse shuffler 2. Selection of the appropriate input of the selector 6" is controlled from the field number at input 7 as will be described hereinafter. The output from selector 6" is applied in the processing arrangement 8 via input block selector 17 to spatial interpolator 19, selector 17 again being controlled by control circuit 18 in response to signals at the branch selection component 3 and field number 17 input, while interpolator 19 responds to the branch selection component at input 3. Interpolator 19 output is again applied to the delay arrangement 10 which in this case comprises the undelayed path 20 and a series of serially connected delay stages 27, 28, 29 and 30 which respectively produce individual delay periods of 20 ms, 20 ms, 40 ms and 20 ms (one, one, two and one field periods). The undelayed path 20 and the outputs of delay stage 27, 28 and 30 are applied to respective inputs of output field selector indicated by the reference 12' and as with selector 6" against each input is noted the number of fields periods delay to which the information has been subjected with respect to the output of the interpolator 19. As with selector 6", selector 12" is operated under the control of the field number at input 7 in the manner to be described hereinafter. The output of selector 12" is connected to the output terminal 13.

The outputs of delay stages 28, 29 and 30 are also connected in the processing arrangement 8 to three of four inputs of a first MCTI selector 31, the fourth input of which is unconnected, and again the number of field periods delay to which the information is subjected with respect to the output of the interpolator 9 is noted against each input. Selector 31 is also operated under the control of the field number at input 17 as will be described while its output is connected to one input of motion compensated temporal interpolator 22 which is again controlled from the motion vectors at input 9. The outputs of interpolator 19 and delay stage 27 are additionally connected to respective inputs of a second MCTI selector 32 also present in processing arrangement 8, the delay periods again being noted against each input, and the selector itself is again controlled from the field number at input 7. Selector 32 output is connected to the second input of the interpolator 22 whose output, as in FIG. 2, is connected through delay stage 23 to the second input of selector 17.

The operation of the arrangement of FIG. 3 is similar to that of FIG. 2 save for the differing delay periods that the information is subjected to at various places. In the situation that the information originates from a 20 ms branch then selector 17 will maintain a continuous connection between its first (1) input and its output. Selector 6" under the control of the field number input sequentially selects information which has been delayed by zero, three, five and four field periods which sequence is repeated, while selector 12" is similarly controlled to sequentially select information which has been further delayed by five, two, zero and one field periods which sequence is also repeated. Each field of information prior to and subsequent to spatial interpolation is subjected to a delay of five field periods as can be seen from the follwing Table 3:

TABLE 3

| | | FIELD NUMBER | | | | | | | | | | | | | | | |
|---|---|---|---|---|---|---|---|---|---|---|---|---|---|---|---|---|---|
| 2 | OP | 1 | 2 | 3 | 4 | 5 | 6 | 7 | 8 | 9 | 10 | 11 | 12 | 13 | 14 | 15 | 16 |
| 17 | OP | 1 | | | | 5 | 3 | 2 | 4 | 9 | 7 | 6 | 8 | 13 | 11 | 10 | 12 |
| 12" | OP | | | | | | 1 | 2 | 3 | 4 | 5 | 6 | 7 | 8 | 9 | 10 | 11 |

If however, the vision signal originates from an 80 ms motion compensated branch in which the information transmitted over four field periods is only valid at the output of inverse shuffler 2 for the first of each four field periods, then the arrangement is set to operate so that the remaining fields are produced from the motion compensated temporal interpolation loop. In this mode of operation block selector 17 is set to receive the first field of each four field period from its first input (1) but during the remaining three fields of each four field period it receives interpolated information from its second input (2). The processing and resultant outputs are best seen from the follwing Table 4:

TABLE 4

| | | FIELD NUMBER | | | | | | | | | | | | | | | |
|---|---|---|---|---|---|---|---|---|---|---|---|---|---|---|---|---|---|
| 2 | OP | 1 | 2 | 3 | 4 | 5 | 6 | 7 | 8 | 9 | 10 | 11 | 12 | 13 | 14 | 15 | 16 |
| 6" | OP | 1 | | | | 5 | | | | 9 | | | | 13 | | | |
| 31· | OP | | | | | 1 | 1 | 5 | | 5 | 5 | 9 | | 9 | 9 | 13 | |
| 32 | OP | | | | | 5 | 3 | 3 | | 9 | 7 | 7 | | 13 | 11 | 11 | |
| 22 | OP | | | | | 3 | 2 | 4 | | 7 | 6 | 8 | | 11 | 10 | 12 | |
| 23 | OP | | | | | | 3 | 2 | 4 | | 7 | 6 | 8 | | 11 | 10 | 12 |
| 17 | OP | 1 | | | | 5 | 3 | 2 | 4 | 9 | 7 | 6 | 8 | 13 | 11 | 10 | 12 |
| 12" | OP | | | | | | 1 | 2 | 3 | 4 | 5 | 6 | 7 | 8 | 9 | 10 | 11 |

From the above table it will be appreciated that the second, third and fourth fields of each four fields sequence of the interlaced output signal are derived from the first field of that and the following sequence.

Where the vision signal comes from areas originating from a 40 ms motion-compensated branch where, as mentioned in relation to FIG. 2, information is available in alternate field periods the block selector 17 will operate as for FIG. 2 selecting the odd fields from its first input (1) and interpolated even fields from its second input (2) again under the control of control unit 18. The processing and resultant outputs are then as shown in the following Table 5:

TABLE 5

| | | FIELD NUMBER | | | | | | | | | | | | | | | |
|---|---|---|---|---|---|---|---|---|---|---|---|---|---|---|---|---|---|
| 2 | OP | 1 | 2 | 3 | 4 | 5 | 6 | 7 | 8 | 9 | 10 | 11 | 12 | 13 | 14 | 15 | 16 |

TABLE 5-continued

| | | | | | | | | | | | | | |
|---|---|---|---|---|---|---|---|---|---|---|---|---|---|
| | | | | | | FIELD NUMBER | | | | | | | |
| 6" | OP | 1 | | 5 | 3 | | 9 | 7 | | 13 | 11 | | |
| 31 | OP | | | 1 | 1 | 5 | | 5 | 5 | 9 | | 9 | 9 | 13 |
| 32 | OP | | | 5 | 3 | 3 | | 9 | 7 | 7 | | 13 | 11 | 11 |
| 22 | OP | | | 3 | 2 | 4 | | 7 | 6 | 8 | | 11 | 10 | 12 |
| 23 | OP | | | | 3 | 2 | 4 | | 7 | 6 | 8 | | 11 | 10 | 12 |
| 17 | OP | 1 | | 5 | 3 | 2 | 4 | 9 | 7 | 6 | 8 | 13 | 11 | 10 | 12 |
| 12" | OP | | | | 1 | 2 | 3 | 4 | 5 | 6 | 7 | 8 | 9 | 10 | 11 |

In the above description, two specific examples are given of arrangements for processing signals derived from branches having particular characteristics. It will be appreciated that other constructions are possible not only for signals originated from the type of branches described but also from branches having differing characteristics. However, for any such processing arrangement the total delay period between the input and the output for each field should be the same. In addition it will be appreciated that the above description relates to luminance signals and that chrominance signals may be similarly processed.

From reading the present disclosure, other modifications will be apparent to persons skilled in the art. Such modifications may involve other features which are already known in the design, manufacture and use of arrangements and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of th same technical problems as does the present invention. The apllicants hereby give notice that new claims may be formulated to such features and/or combinations of such features during the prosecution of the present application or of any further application derived therefrom.

We claim:

1. A method of processing a signal representing a sequence of two-dimensional images conveyed in sub-sampled form by way of a transmission channel or record carrier and subjected, prior to said conveyance, to different sampling structures on a segmented basis depending on the degree of movement and/or the character of spatial information, said method including the step of receiving the sub-sampled signal from said transmission channel or record carrier sequentially on a field by field basis, said method being characterized by the further steps of:
   i. forming from said received sub-sampled signal a further sub-smapled signal containing the same information but in which the order of the fields is changed compared with that in said received signal;
   ii. subjecting said further sub-sampled signal to inter-field and/or intra-field processing; añd
   iii. forming from the resulting processed signal an output signal in which the order of the fields is restored to the sequence present in said received signal.

2. A method as claimed in claim 1, characterized in that the order of the fields in the further sub-sampled signal is dependent upon the segmented sampling structures of the received sub-sampled signal.

3. A method as claimed in claim 1 or 2, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

4. A method as claimed in claim 1 or 2, characterized in that in forming said received sub-sampled signal into said further sub-sampled signal, said received sub-sampled signal has its fields subjected to zero or an integral number of field periods delay in a given sequence over a given number of field periods, while in forming said processed signal, into said output signal said processed signal has its fields subjected to zero or an integral number of field periods delay in a further given sequence over said given number of field periods, the overall delay period to which each field is subjected between receiving said sub-sampled signal and the output signal being the same.

5. A method as claimed in claim 4, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

6. A method as claimed in claim 1 or 2, characterized in that the nature of the inter-field or intra-field processing to which said further sub-sampled signal is subjected is dependent upon the segmented sampling structure of the received sub-sampled signal.

7. A method as claimed in claim 6, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

8. A method as claimed in claim 6, characterized in that said further sub-sampled signal is subjected to motion compensated temporal interpolation under the control of an additional signal received with said received sub-sampled signal which additional signal relates to the degree of movement of said received sub-sampled signal.

9. A method as claimed in claim 8, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

10. A method as claimed in claim 6, characterized in that in forming said received sub-sampled signal into said further sub-sampled signal, said received sub-sampled signal has its field subjected to zero or an integral number of field periods delay in a given sequence over a given number of field periods, while in forming said processed signal into said output signal, said processed signal has its fields subjected to zero or an integral number of field periods delay in a further given sequence over said given number of field periods, the overall delay period to which each field is subjected between receiving said sub-sampled signal and the output signal being the same.

11. A method as claimed in calim 10, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

12. A method as claimed in claim 6, chracterized in that said further sub-sampled signal is subjected to spatial interpolation under the control of a control signal received with said received sub-sampled signal which control signal relates to the character of the spatial information and/or the motion of said received sub-sampled signal.

13. A method as claimed in claim 12, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

14. A method as claimed in claim 12, characterized in that said further sub-sampled signal is subjected to motion compensated temporal interpolation under the control of an additional signal received with said received sub-sampled signal which additional signal relates to the degree of movement of said received sub-sampled signal.

15. A method as claimed in claim 14, in which the sub-sampled signal, as received, is a television signal having lines which are interlaced over a number of field periods, characterized in that said received sub-sampled signal is converted to a non-interlaced signal having the same field period as the received signal prior to forming the further sub-sampled signal which on processing is re-converted to form an interlaced signal.

16. Receiving apparatus for use with a system in which a signal representing a sequence of two-dimensional images in conveyed in sub-sampled form by way of a transmission channel or record carrier and subjected, prior to transmission, to different sampling structures on a segmented basis depending on the degree of movement and/or the character of spatial information, said receiving apparatus comprising means for receiving the sub-sampled signal from said transmission channel or record carrier sequentially on a field-by-field basis, characterized in that said apparatus further comprises means for forming from said received sub-sampled signal a further sub-sampled signal containing the same information but in which the order of the fields is changed compared with that in said received signal, means for subjecting said further sub-sampled signal to inter-field and/or intra-field processing, and means for forming from the resulting processed signal an output signal in which the order of the fields is restored to the sequence present in said received signal.

17. Receiving apparatus as claimed in claim 16, characterized in that said means for forming said further sub-sampled signal comprises means for arranging the fields of the further sub-sampled signal in an order which depends on the segmented structures of the received sub-sampled signal.

18. Receiving apparatus as claimed in claims 16 or 17, in which said received sub-sampled signal is a television signal the lines of which are interlaced over a number of field periods, characterized in that said apparatus further comprises means for converting said received sub-sampled signal into a non-interlaced signal of the same field period, while said processing means comprises means for converting said processed signal into an interlaced signal.

19. Receiving apparatus as claimed in claim 16 or 17, characterized in that said means for forming said further sub-sampled signal comprises a first delay arrangement for subjecting the received fields to zero or an integral number of field periods delay in a given sequence over a given number of field periods, while said means for forming said output signal comprises a second delay arrangement for subjecting the fields of said processed signal to zero or an integral number of field periods delay in a further given sequence over said given number of fields periods, the overall delay period to which each field is subjected between the received sub-sampled signal and the ouput signal being the same.

20. Receiving apparatus as claimed in claim 19, in which said received sub-sampled signal is a television signal having lines which are interlaced over a number of field periods, characterized in that said apparatus further comprises means for converting said received sub-sampled signal into a non-interlaced signal of the same field period, while said processing means comprises means for converting said processed signal into an interlaced signal.

21. Receiving apparatus as claimed in claim 8 or 9, characterized in that the nature of the operation of said processing means is dependent upon the segmented sampling structure of the received sub-sampled signal.

22. Receiving apparatus as claimed in claim 21, in which said received sub-sampled signal is a television signal having lines which are interlaced over a number of field periods, characterized in that said apparatus further comprises means for converting said received sub-sampled signal into a non-interlaced signal of the same field period, while said processing means comprises means for converting said processed signal into an interlaced signal.

23. Receiving apparatus as claimed in claim 21, characterized in that said apparatus further comprises means for receiving, with said received sub-sampled signal, an additional signal relating to the degree of movement of said received signal, said processing means subjecting said further sub-sampled signal to motion compensated temporal interpolation under the control of said additional signal.

24. Receiving apparatus as claimed in claim 23, in which said received sub-sampled signal is a television signal having lines which are interlaced over a number of field periods, characterized in that said apparatus further comprises means for converting said received sub-sampled signal into a non-interlaced signal of the same field period, while said processing means comprises means for converting said processed signal into an interlaced signal.

25. Receiving apparatus as claimed in claim 21, characterized in that said means for forming said further sub-sampled signal comprises a first delay arrangement for subjecting the received fields to zero or an integral number of field periods delay in a given sequence over a given number of field periods, while said means for forming said output signal comprises a second delay arrangement for subjecting the fields of said processed signal to zero or an integral number of field periods delay in a further given sequence over said given number of fields periods, the overall delay period to which each field is subjected between the received sub-sampled signal and the output signal being the same.

26. Receiving apparatus as claimed in claim 25, in which said received sub-sampled signal is a television signal having lines which are interlaced over a number of field periods, characterized in that said apparatus further comprises means for converting said received sub-sampled signal into a non-interlaced signal of the same field period, while said processing means comprises means for converting said processed signal into an interlaced signal.

27. Receiving apparatus as claimed in claim 21, characterized in that said apparatus further comprises means for receiving, with said received sub-sampled signal, a control signal relating to the character of the spatial information and/or the motion of said received signal, said processing means subjecting said further sub-sampled signal to spatial interpolation under the control of said control signal.

28. Receiving apparatus as claimed in claim 27, in which said received sub-sampled signal is a television signal having lines which are interlaced over a number of field periods, characterized in that said apparatus further comprises means for converting said recieved sub-sampled signal into a non-interlaced signal of the same field period, while said processing means comprises means for converting said processed signal into an interlaced signal.

29. Receiving apparatus as claimed in claim 27, characterized in that said apparatus further comprises means for receiving, with said received sub-sampled signal, an additional signal relating to the degree of movement of said received signal, said processing means subjecting said further sub-sampled signal to motion compensated temporal interpolation under the control of said additional signal.

30. Receiving apparatus as claimed in claim 29, in which said received sub-sampled signal is a television signal having lines which are interlaced over a number of field periods, characterized in that said apparatus further comprises means for converting said received sub-sampled signal into a non-interlaced signal of the same field period, while said processing means comprises means for converting said processed signal into an interlaced signal.

* * * * *